US009927122B2

(12) United States Patent
Mundhra

(10) Patent No.: US 9,927,122 B2
(45) Date of Patent: Mar. 27, 2018

(54) CARABINER WITH FIRE-STARTER

(71) Applicant: Siya, Inc., Santa Fe Springs, CA (US)

(72) Inventor: Sudhir Mundhra, Cerritos, CA (US)

( * ) Notice: Subject to any disclaimer, the term of this patent is extended or adjusted under 35 U.S.C. 154(b) by 412 days.

(21) Appl. No.: 14/810,316

(22) Filed: Jul. 27, 2015

(65) Prior Publication Data

US 2016/0025340 A1 Jan. 28, 2016

Related U.S. Application Data

(60) Provisional application No. 62/029,268, filed on Jul. 25, 2014.

(51) Int. Cl.

| | |
|---|---|
| ***F23Q 2/32*** | (2006.01) |
| ***F23Q 1/06*** | (2006.01) |
| ***F16B 45/02*** | (2006.01) |
| *F21V 33/00* | (2006.01) |

(52) U.S. Cl.

CPC ................ *F23Q 1/06* (2013.01); *F16B 45/02* (2013.01); *F21V 33/00* (2013.01)

(58) Field of Classification Search

CPC ........ F21V 33/0004; F21V 33/00; F23Q 1/06; F16B 45/02; F16B 45/025; F16B 45/04; F16B 45/06

See application file for complete search history.

*Primary Examiner* — Jason Lau

(74) *Attorney, Agent, or Firm* — Cislo & Thomas, LLP

(57) ABSTRACT

A carabiner having a fire-starter for easily mounting the fire-starter on to a variety of items for quick and easy access and easy carry. The carabiner has a loop to fasten to the variety of items. The fire-starter utilizes a flint that can be scraped across the rasp attached to the body of the carabiner. A light emitting device may also be attached to the body and configured to emit light near the fire-starter so as to illuminate the area where the fire is to be started. The fire-starter may further comprise a lock to prevent unintentional sparks from being created.

20 Claims, 2 Drawing Sheets

104
124
122
108
126
118
132
102
112
130
120
114
134
146
106
144
100
142

CARABINER WITH FIRE-STARTER

CROSS-REFERENCE TO RELATED APPLICATION

This patent application claims the benefit of U.S. Provisional Patent Application Ser. No. 62/029,266, entitled "Carabiner Fire-Starter," filed Jul. 25, 2014, which application is incorporated in its entirety here by this reference.

TECHNICAL FIELD

This invention relates to a carabiner with additional utility for starting fires.

BACKGROUND

Outdoor enthusiasts are constantly battling with the amount of gear and equipment to carry and the level of preparation necessary to survive or enjoy the wilderness. The outdoor enthusiast can take a cautious approach and be very well prepared for almost any situation, but at the cost of carrying heavy gear. The minimalist may carry very few necessary tools, but experience great challenges.

Aside from how much gear to carry, the outdoorsmen has to determine where to carry the tools for the gear, such as in a backpack, on his belt, in his pocket, etc. The location for carrying tools in the gear may be determined by a number of factors, such as such probability of use, importance, ease of access, and the like. The more tools a person carries, the more the person has to consider where to carry the tool. The more tools the person carries in a single gear, the more difficult it becomes for retrieving the tool when needed.

Therefore, there is still a need for a device that facilitates carrying tools in an efficient manner that is secure and easily accessible.

SUMMARY

The present invention is directed to a carabiner that also provides a feature for starting fires. The carabiner with a fire-starter comprises a body; a striker assembly; and a gated loop, wherein the body structurally connects the striker assembly, and the gated loop. In some embodiments, the carabiner with a fire-starter further comprises a light-emitting device, preferably positioned so that the light emitting device emits light near the striker assembly so as to illuminate the area where the user desires to start a fire.

BEST MODE FOR CARRYING OUT THE INVENTION

Figures 1, 2:
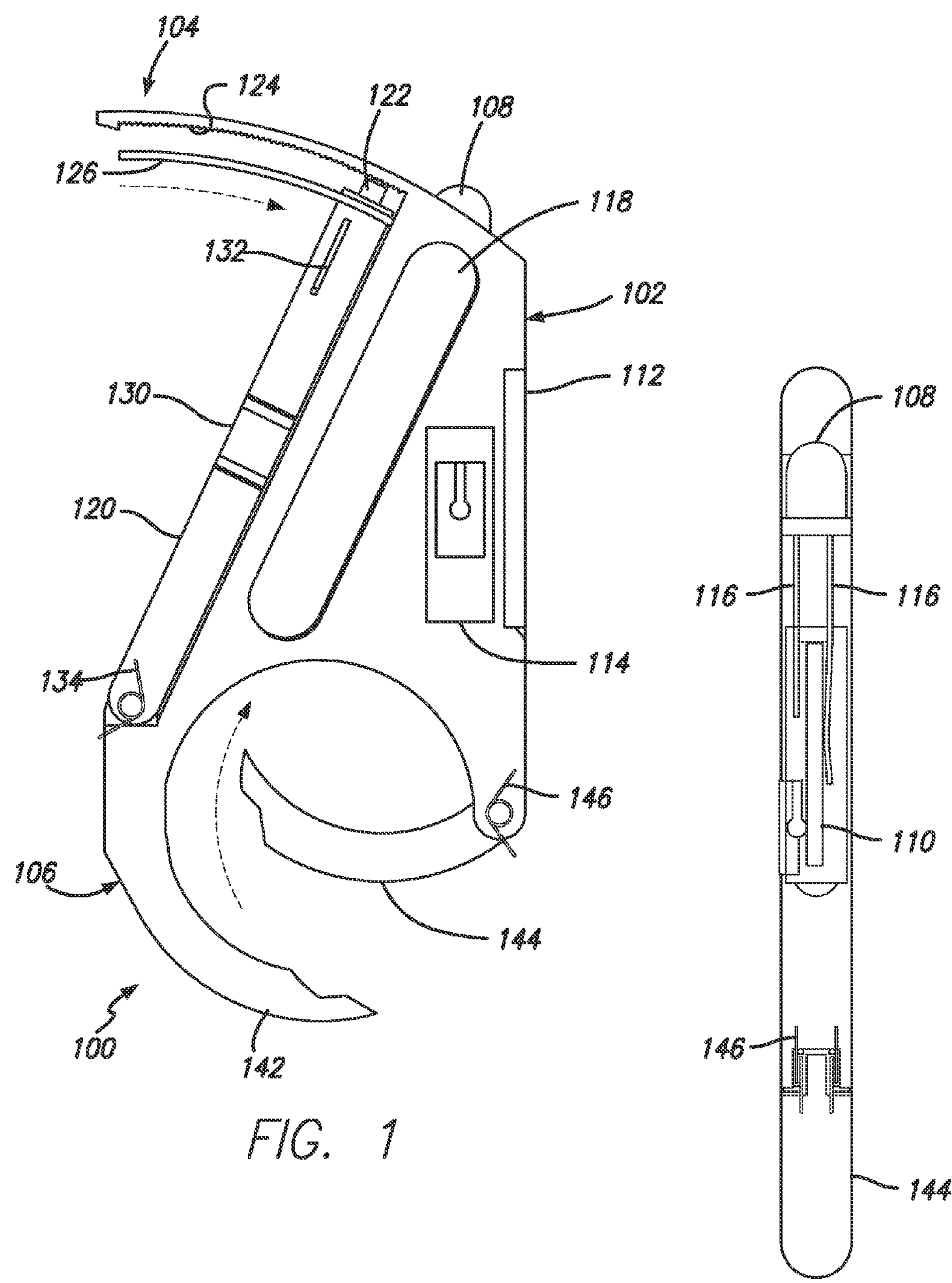
FIG. 1 is a front view of an embodiment of a carabiner.
FIG. 2 is a right side view of the embodiment of the carabiner shown in FIG. 1. In this view, portions of the body shown in FIG. 1 are not included here to make visible some of the internal electronics (including the battery, the light-emitting device, and the electronics between them) of the depicted embodiment. In the preferred embodiment, the electronics, battery, and portions of the light-emitting device would not be visible during use.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Referring to the figures, the carabiner having a fire-starter 100 includes a body 102, a striker assembly 104, and a gated loop 106 to provide a compact fire-starter that can be easily attached to clothing, outdoor gear, or another object. In some embodiments, the carabiner further comprises a light-emitting device 108 to illuminate fire-starting materials in the dark.

The body 102 structurally connects the striker assembly 104, the gated loop 106, and the light-emitting device 108 to each other. The body 102 also includes a battery 110, a battery door 112, a switch 114, and electronics 116. Preferably, the body 102 is made from a durable, non-brittle plastic, such as high-impact polystyrene, or a relatively lightweight metal, such as aluminum. In some versions, the body 102 includes a nameplate 118. The nameplate 118 might include an advertisement, a brand or company name, the user's name, or other identifying information. The nameplate 118 could be attached to the body 102 by an adhesive, or the nameplate 118 could be molded into the body 102 during manufacture.

The electronics 116 electrically connect the battery 110, through the switch 114, to the light-emitting device 108. When the switch 114 is in an "off" position, the battery 110 is not connected to the light-emitting device 108, and the light-emitting device 108 does not emit light. When the switch 114 is in an "on" position, the battery 110 is connected to the light-emitting device 108, and the light-emitting device 108 emits light. Preferably, the switch 114 is an on/off slide switch 114, which allows the user to slide the switch 114 between the "on" position and the "off" position.

The battery 110 is housed within the body 102, and it may be accessed through the battery door 112. In some versions, the battery 110 is not accessible to the user, and the body 102 does not include a battery door 112. The battery 110 is preferably a lithium coin battery. Most preferably, the battery 110 is a 3-volt lithium coin battery having the designation CR2016. However, any power source can be used as long as it is compact enough to be contained within the body 102 and powerful enough to cause the light-emitting device 108 to emit light. While an external power source is also contemplated (the power source being outside the body 102), it is not preferred since the carabiner with fire-starter

100 is intended to be compact and easily portable, such as by attaching the carabiner with fire-starter 100 to a user's belt loop or backpack.

The striker assembly 104 includes a striker arm 120, a flint 122, a rasp 124, and a rail 126 to produce a spark to, for example, light a fire, propane burner, or gas lantern. The spark is produced by friction as the flint 122 is scraped against the rasp 124.

Figures 3, 4:
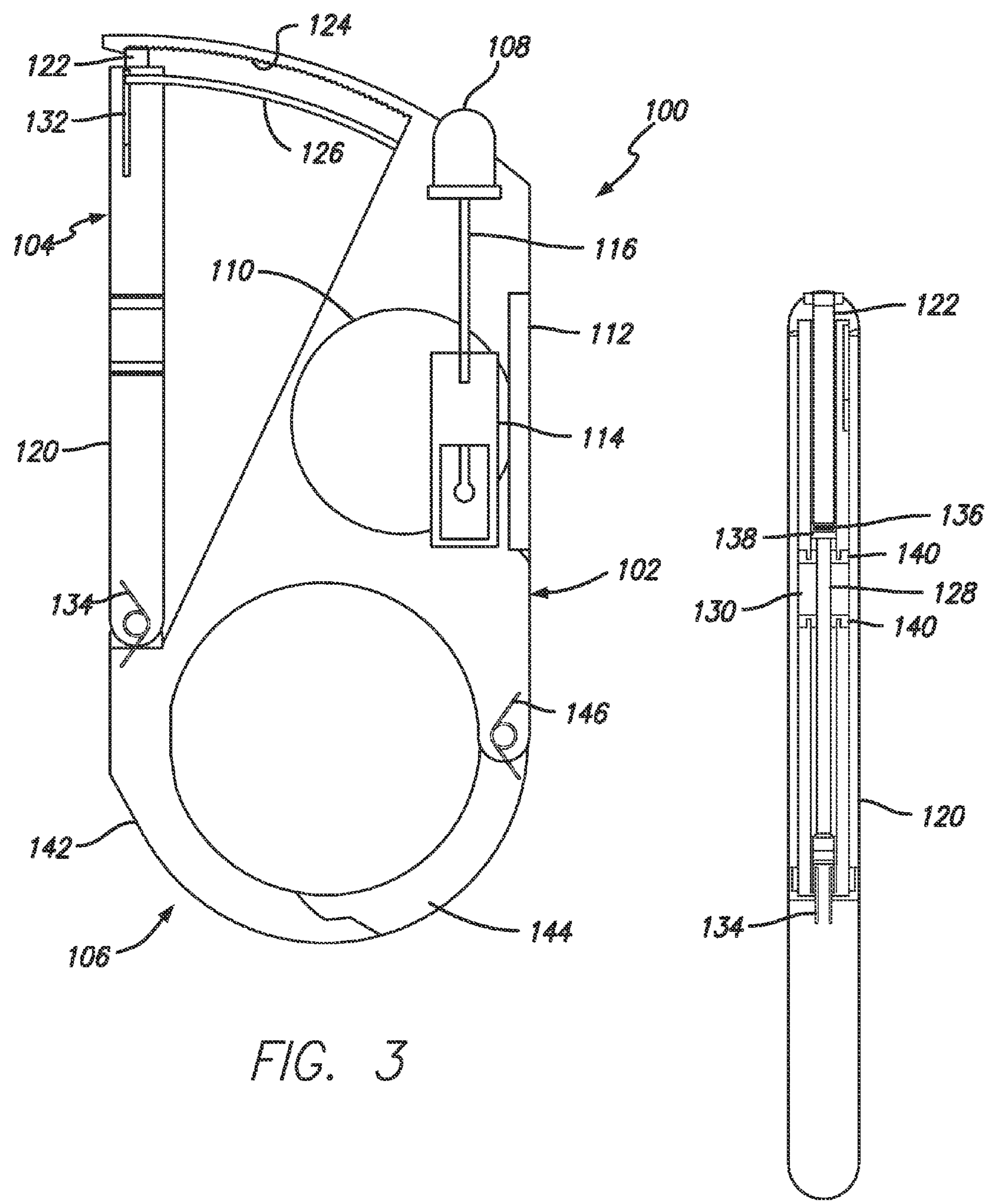
FIG. 3 is a front side view of the embodiment of the carabiner shown in FIG. 1, except the striker arm is in the first configuration. Also, in this view portions of the body shown in FIG. 1 are not included here to make visible some of the internal electronics (including the battery, the light-emitting device, and the electronics between them) of the depicted embodiment. In the preferred embodiment, the electronics, battery, and portions of the light-emitting device would not be visible during use.
FIG. 4 is a left side view of the embodiment of the carabiner shown in FIG. 1. In this view, portions of the striker arm shown in FIGS. 1 and 3 are not included here to make visible some of the internal components of the striker arm of the depicted embodiment. In the preferred embodiment, the screw, screw head, spring, and portions of the flint would not be visible during use.

The striker arm 120 preferably has a screw 128, a screw feed 130, and a slide lock 132. The striker arm 120 has a first end and a second end, the striker arm defining a striker arm axis through the first and second ends. The second end of the striker arm 120 is pivotably connected to the body 102, preferably adjacent the gated loop 106. The pivotable connection between the striker arm 120 and the body 102 preferably includes a torsion spring 134 to bias the striker arm 120 to a first configuration. The first configuration is shown in FIG. 3. During use, the first end of the striker arm 120 is moved from the first configuration to a second configuration (shown in FIG. 1) through the application of force to the striker arm 120, causing it to pivot about the striker arm's connection to the body 102, preferably through an arcuate path. The force is typically from the user's finger. As shown in the figures, the flint 122 generally extends from the first end of the striker arm 120 that is opposite the second end of the striker arm 120 that is pivotably connected to the body 102.

In some embodiments, the carabiner with fire-starter comprises a flint adjuster to finely and accurately adjust the position of the flint 122, particularly the amount the flint 122 extends from the end of the striker arm 120. In the preferred embodiment, the flint adjuster comprises a screw 128 and screw feed 130 that work together. The screw 128 is threadably connected to the screw feed 130, which preferably has a cylindrical shape. In the depicted embodiment, the screw feed 130 is rotated by the user, which in turn rotates the screw 128. Within the striker arm 120, the screw 128 contacts an end of the flint 122. As the screw feed 130 rotates in a first direction, the flint 122 is pushed toward the rasp. As the screw feed 130 rotates in a second direction, the flint 122 retreats away from the rasp. Preferably, the screw feed 130 rotates about the striker arm axis (i.e. a longitudinal axis of the striker arm 120). Other mechanisms can be used to adjust the amount of flint exposed, including springs and slides.

In some versions, the end of the screw 128 that contacts the flint 122 may include a spring 136, preferably a helical compression spring, between the screw 128 and the flint 122. The spring 136 helps prevent damage to the flint 122 by allowing the flint 122 to move during use in the direction of the pivotable connection between the striker arm 120 and the body 102. The screw 128 may also include a screw head 138 for the spring 136 to push against.

In some embodiments, the striker arm 120 includes two washers 140, one at each end of the cylindrical screw feed 130. The washers 140 help guide and position the screw 128 as it passes through the screw feed 130. The washers 140 also help provide lateral stability to the screw 128, which keeps the screw 128 moving only in the desired directions. Additionally, the washers 140 provide surfaces for the screw feed 130 to rotate against. This helps ensure that the screw 128 is moved toward or away from the rasp 124, instead of being the screw feed 130 that is moved toward or away from the rasp 124 as the screw feed 130 is rotated.

The slide lock 132 interacts with the rail 126 to prevent unwanted scraping of the flint 122 over the rasp 124. To accomplish this, the slide lock 132 has a locked position and an unlocked position. In the locked position, the slide lock 132 contacts an end of the rail 126, preferably by overlapping the end of the rail 126 as shown in FIG. 3. In the locked position, the user is unable to pivot the striker arm 120 to the second configuration because the slide lock 132 contacts an end of the rail 126 and prevents such movement. In the unlocked position (shown in FIG. 1), the slide lock 132 is retracted and does not contact the rail 126, and the user is able to pivot the striker arm 120 to the second configuration. In this way, the user can prevent unwanted scraping of the flint 122 over the rasp 124 since the slide lock 132 serves as a physical barrier to that movement. In the preferred embodiment, the user slides the slide lock 132 between the locked position and the unlocked position. Other locking mechanisms can be used to prevent the striker arm from moving.

The flint 122 is preferably ferrocerium, which is the material commonly used in the sparking mechanism of disposable cigarette lighters. The flint 122 is preferably in the shape of an elongated cylinder, fitting inside the striker arm 120 except for that portion of the flint 122 that extends from the striker arm 120 to contact the rasp 124. This is shown in FIGS. 3 and 4.

The rasp 124 has a plurality of sharp, hard edges or teeth. During use of the carabiner with fire-starter 100, as the striker arm 120 is pivoted from the first configuration to the second configuration, the flint 122 is scraped over the rasp. Small particles of the ferrocerium flint 122 are shaved off by the teeth through friction. The particles then ignite from the heat produced by the friction to form sparks. Since the teeth must be sharp and hard, the rasp 124 is preferably made from steel. Additionally, the rasp 124 is preferably arc-shaped so that the teeth of the rasp 124 make even contact with the flint 122 as the striker arm 120 is pivoted during use.

The rail 126 guides the striker arm 120 as the striker arm 120 is pivoted during use. Consequently, the rail 126 is preferably arc-shaped like the rasp 124 so as to parallel the rasp 124. The rail 126 guides the striker arm 120 by contacting the striker arm 120 as the striker arm 120 is moved by the user. In this way, the striker arm 120 is kept on an arcuate path and in contact with the rasp 124. When coupled with the slide lock, the rail 126 forms a locking mechanism as described above to prevent unwanted scraping of the flint 122 over the rasp 124.

The gated loop 106 preferably consists of a first segment 142 and a second segment 144 that, together with a portion of the body 102, form a loop in certain configurations. Like the body 102, the gated loop 106 preferably is made from a durable, non-brittle plastic, such as high-impact polystyrene, or a relatively lightweight metal, such as aluminum.

In the preferred configuration, the first segment 142 is rigidly connected to the body 102 at an end of the first segment, and the second segment 144 is pivotably connected to the body 102 at an end of the second segment 144. The end of the first segment 142 that is opposite the rigidly connected end is designated the free end. The end of the second segment 144 that is opposite the pivotably connected end is designated the free end.

The pivotable connection between the second segment 144 and the body 102 preferably includes a torsion spring 146 to bias the second segment 144 to a closed configuration. The closed configuration is shown in FIG. 3 and exists when the first segment 142 directly contacts the second segment 144 to form a closed loop.

When a force is applied to the free end of the second segment, the second segment 144 is placed in an open configuration. The open configuration is shown in FIG. 1 and exists when the first segment 142 does not directly contact the second segment. The force is typically from the user's finger. In this way, the user may create a gap between the first segment 142 and the second segment 144 to connect the carabiner with fire-starter 100 to a user's belt loop or backpack by surrounding the belt loop or backpack loop or strap with the first segment 142 and the second segment 144 and then releasing the force, causing the torsion spring 146 to bias the second segment 144 to the closed configuration. This secures the carabiner with fire-starter 100 to the user's belt loop or backpack.

Preferably, the free end of the second segment 144 is stepped, and the free end of the second segment 144 is correspondingly stepped. An example of this is shown in FIGS. 1 and 3. In this way, the free end of the second segment 144 and the free end of the first segment 142 interlock, to form a strong connection between first segment 142 and the second segment 144. The interlocking steps also form a stop to prevent the free end of the second segment 144 from pivoting beyond the free end of the first segment 142 when the second segment 144 is biased by the torsion spring 146.

Although the gated loop 106 preferably forms a circular loop, non-circular shapes are also contemplated and effective for the stated purposes. Additionally, in some versions, the gated loop 106 need not be gated. In such versions, both ends of the first segment 142 are rigidly connected to the body 102, and there is no second segment 144. Accordingly, there is no open configuration, and the gated loop 106 is always in a closed configuration in such embodiments.

The light-emitting device 108 is an electronically controlled device that emits light when electrically energized. Preferably, the light-emitting device 108 is a light-emitting diode (LED). Additionally, the light-emitting device 108 is preferably positioned on the body 102 such that, when emitting light, the light-emitting device 108 will illuminate an area near the flint 122. In this way, the user can illuminate the user's kindling or other flammable materials, which during use are located near the striker assembly 104 to catch sparks from the flint 122. The light-emitting device 108 can emit light of any color, although white light and red light are preferred. White light is preferred because it allows the user to view objects near the light-emitting device 108 in true color. Red light is preferred because it does not impair the user's night vision.

In this way, the invention provides a compact fire-starter that can be easily attached to clothing, outdoor gear, or another object and includes a light to illuminate fire-starting materials in the dark.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

What is claimed is:

1. A carabiner with fire-starter, comprising:

(a) a body;

(b) a striker assembly;

(c) a gated loop; and (d) a light-emitting device, wherein the body structurally connects the striker assembly, the gated loop, and the light-emitting device to each other, (e) wherein the striker assembly comprises a striker arm having a first end and a second end opposite the first end, the striker arm defining a striker arm axis through the first end and the second end, the second end operatively connected to the body via a pivotable connection to allow the first end to move in an arcuate path; a flint operatively connected to the striker arm at the first end; a rasp adjacent to the flint such that when the striker arm moves along the arcuate path, the flint scrapes across the rasp to create a spark; a rail operatively connected to the body and the striker arm to guide the striker arm along the arcuate path; a screw abutting the flint; a screw feed operatively connected to the screw, wherein when the screw teed is rotated in a first direction, the screw pushes the flint towards the rasp, and wherein when the screw feed is rotated in a second direction, the flint retreats away from the rasp; a spring between the screw and the flint to reduce damage to the flint by allowing the flint to move along the striker arm axis during use; a pair of washers, one washer at opposite ends of the screw feed to guide and position the screw as it passes through the screw feed; and a slide lock operatively connected to the rail, the slide lock having a locked position and an unlocked position, wherein in the locked position, the slide lock locks with the rail to prevent pivoting of the striker arm, and wherein in the unlocked position, the slide lock is released from the rail to permit pivoting of the striker arm, wherein the rasp is arc-shaped and comprises a plurality of sharp, hard teeth, wherein the rail is arc-shaped to parallel the rasp, (f) wherein the gated loop comprises a first segment rigidly fixed to the body; a second segment pivotally connected to the body such that a portion of the body, the first segment, and the second segment together form a loop when in a closed configuration; and a spring to bias the second segment against the first segment to maintain the closed configuration, and (g) wherein the light-emitting device is an electronically controlled device that emits light when electrically energized, and the light-emitting device is adjacent to the rasp to illuminate an area near the flint.

2. A carabiner with fire-starter, comprising:

(a) a body;

(b) a striker assembly;

(c) a gated loop; and (d) a light-emitting device, wherein the body structurally connects the striker assembly, the gated loop, and the light-emitting device to each other, (e) wherein the striker assembly comprises a striker arm having a first end and a second end opposite the first end, the striker arm defining a striker arm axis through the first end and the second end, the second end operatively connected to the body via a pivotable connection to allow the first end to move in an arcuate path; a flint operatively connected to the striker arm at the first end; a rasp adjacent to the flint such that when the striker arm moves along the arcuate path, the flint scrapes across the rasp to create a spark; a rail operatively connected to the body and the striker arm to guide the striker arm along the arcuate path; and a flint adjuster.

3. The carabiner with fire-starter of claim 2, wherein the flint adjuster comprises a screw abutting the flint; and a screw feed operatively connected to the screw, wherein when the screw feed is rotated in a first direction, the screw pushes the flint towards the rasp, and wherein when the screw feed is rotated in a second direction, the flint retreats away from the rasp.

4. The carabiner with fire-starter of claim 3, further comprising a spring between the screw and the flint to reduce damage to the flint by allowing the flint to move along the striker arm axis during use.

5. The carabiner with fire-starter of claim 4, further comprising a pair of washers, one washer at opposite ends of the cylindrical screw feed to guide and position the screw as it passes through the screw feed.

6. The carabiner with fire-starter of claim 5, further comprising a slide lock operatively connected to the rail, the slide lock having a locked position and an unlocked position, wherein in the locked position, the slide lock locks with the rail to prevent pivoting of the striker arm, and wherein in the unlocked position, the slide lock is released from the rail to permit pivoting of the striker arm.

7. The carabiner with fire-starter of claim 6, wherein the light-emitting device is an electronically controlled device that emits light when electrically energized, and the light-emitting device is adjacent to the rasp to illuminate an area near the flint.

8. A carabiner with fire-starter, comprising:

(a) a body;

(b) a striker assembly;

(c) a gated loop; and (d) a light-emitting device, wherein the body structurally connects the striker assembly, the gated loop, and the light-emitting device to each other.

9. The carabiner with fire-starter of claim 8, the striker assembly comprises:

(a) a striker arm having a first end and a second end opposite the first end, the striker arm defining a striker arm axis through the first end and the second end, the second end operatively connected to the body via a pivotable connection to allow the first end to move in all arcuate path;

(b) a flint operatively connected to the striker arm at the first end;

(c) a rasp adjacent to the flint such that when the striker arm moves along the arcuate path, the flint scrapes across the rasp to create a spark; and (d) a rail operatively connected to the body and the striker arm to guide the striker arm along the arcuate path.

10. The carabiner with fire-starter of claim 9, wherein the striker arm comprises a adjuster.

11. The carabiner with fire-starter of claim 10, wherein the flint adjuster comprises:

(a) a screw abutting the flint; and (b) a screw feed operatively connected to the screw, wherein when the screw feed is rotated in a first direction, the screw pushes the flint towards the rasp, and wherein when the screw feed is rotated in a second direction, the flint retreats away from the rasp.

12. The carabiner with fire-starter of claim 11, wherein the striker arm further comprises a spring between the screw and the flint to reduce damage to the flint by allowing the flint to move along the striker arm axis during use.

13. The carabiner with fire-starter of claim 12, wherein the striker arm further comprises a pair of washers, one washer at opposite ends of the cylindrical screw feed to guide and position the screw as it passes through the screw feed.

14. The carabiner with fire-starter of claim 9, wherein the striker arm further comprises a slide lock operatively connected to the rail, the slide lock having a locked position and an unlocked position, wherein in the locked position, the slide lock locks with the rail to prevent pivoting of the striker arm, and wherein in the unlocked position, the slide lock is released from the rail to permit pivoting of the striker arm.

15. The carabiner with fire-starter of claim 9, wherein the rasp is arc-shaped and comprises a plurality of sharp, hard teeth.

16. The carabiner with fire-starter of claim 15, wherein the rail is arc-shaped to parallel the rasp.

17. The carabiner with fire-starter of claim 9, wherein the light-emitting device is adjacent to the rasp to illuminate an area near the flint.

18. The carabiner with fire-starter of claim 8, wherein the gated loop comprises:

(a) a first segment rigidly fixed to the body, and (b) a second segment pivotally connected to the body such that a portion of the body, the first segment, and the second segment together form a loop when in a closed configuration.

19. The carabiner with fire-starter of claim 17, wherein the gated loop further comprises a spring to bias the second segment against the first segment to maintain the closed configuration.

20. The carabiner with fire-starter of claim 8, wherein the light-emitting device is an electronically controlled device that emits light when electrically energized.

* * * * *